Feb. 8, 1938. E. W. TAYLOR 2,107,431
ANTISKID CROSS CHAIN
Filed Jan. 27, 1937
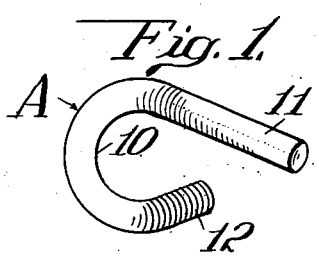
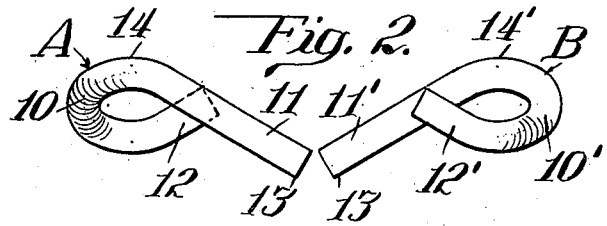
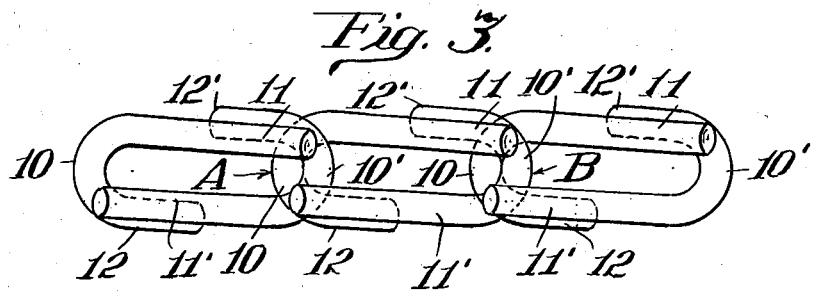
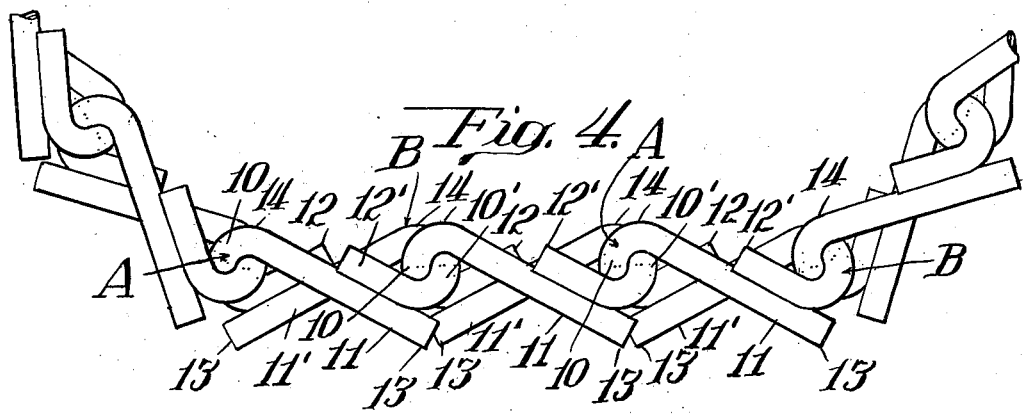
Inventor
Edward Winthrop Taylor
By Barnett & Truman
Attorneys Patented Feb. 8, 1938

2,107,431

UNITED STATES PATENT OFFICE 2,107,431

ANTISKID CROSS CHAIN

Edward Winthrop Taylor, Hammond, Ind., assignor to S. G. Taylor Chain Co., Hammond, Ind., a corporation of Illinois Application January 27, 1937, Serial No. 122,612

6 Claims. (Cl. 152—14)

This invention relates to an anti-skid chain and, more particularly, to links adapted to form an improved cross chain for automobile tires.

According to the present invention each link of the chain consists broadly of two substantially U-shaped link members, the respective legs of each being overlapped and welded or otherwise secured together.

The principal object of the invention is to provide an anti-skid chain which is long wearing, of high tractional efficiency and yet relatively light in weight and of simple construction.

Another object of the invention is to provide an improved link construction adapted to prevent a vehicle equipped with chains constructed of such links from skidding.

Another object is to provide a chain which will not kink and which will not retain snow, ice and other substances which would otherwise tend to impair its general efficiency.

Other and further objects of the invention will appear in the course of the following description.

The invention, in its preferred form is illustrated in the accompanying drawing, in which—

Fig. 1 is a perspective view of one of the link members.

Fig. 2 is a side elevation of two of the link members illustrating their general position before being brought together to form a completed link.

Fig. 3 is a bottom view of the finished link showing similar links connected thereto.

Fig. 4 is a side elevation of a plurality of links joined together to form a chain.

Referring to Fig. 1, the reference character A indicates one of the link members which is adapted to be secured to a similar member to form the completed link. The member is formed to provide an open loop 10 and two legs 11 and 12, thus forming a substantially U-shaped structure. For reasons hereinafter set forth, the legs are preferably of unequal lengths, the longer leg 11 being bent, as best illustrated in Fig. 1, to extend away from the plane of the open loop 10 and the short leg 12 at an angle of substantially 45° and also slightly inwardly toward the short leg 12.

Referring to Fig. 2, link member A is shown in relative position to another link member B before the two are brought together to form the completed link as illustrated in Figs. 3 and 4. Member B is preferably identical to member A having an open loop 10', a short leg 12' and a long leg 11', the long leg 11' being bent away from the plane of the loop 10' and toward short leg 12' as above described in connection with the leg 11 of member A.

Referring to Fig. 3, the members A and B are brought together in such manner that the short leg 12 of the member A overlaps the long leg 11' of member B longitudinally or, in other words, along the length thereof and, in like manner, the short leg 12' of member B overlaps long leg 11 of member B. When in this position the members are secured together by welding or other suitable means. Obviously, when other link members are added to form a chain they must, before being secured together, be first joined to a previously formed link.

As best illustrated in Fig. 4, each leg 11, 11' projects slightly beyond the short leg to which it is secured, thus providing a ground engaging projection 13. The advantage of such construction lies in the fact that the ground engaging portions 13 are relatively sharp and of small surface area. In several link constructions now manufactured the ground engaging portions consist of a considerable length of the link stock with the result that it tends, when in service, to act in like manner as the runner of a skate, thus promoting rather than preventing skidding. With the present construction such objection is entirely obviated.

It is further noted that when the ground-engaging projections 13 wear off the link is still intact and serviceable, further wear being taken by the combined ground-engaging surfaces of the long and short legs.

By shortening the legs 12, 12' a double purpose is accomplished. First, the link is materially lightened without detracting from its efficiency, and, secondly, no sharp ends will bear against the tire, the ends of legs 12, 12' being below the smooth tire-engaging peripheries of loops 10 and 10', as indicated at 14 (Figs. 2 and 4).

The self-cleaning characteristic of the chain is best illustrated in Fig. 3, where it is seen that the link members form an open loop of sufficient width to permit an adjacent link to move freely therein. This freedom of movement tends to break up and discharge any snow or ice which may accumulate within the links. It likewise serves to prevent kinking.

While I have herein illustrated and described a preferred form of construction of the improved tire chain and a convenient method of forming the links thereof, it is obvious that various modifications may be made in the details of construction which would fall within the spirit and scope of the invention.

Therefore, without limiting myself in this respect, I claim:

1. A link for an anti-skid chain consisting of two substantially U-shaped members each having legs of unequal length, the short leg of each member being overlapped on and secured to the long leg of the other.

2. A link for an anti-skid chain consisting of two substantially U-shaped members each having legs of unequal length extending at an angle to each other, the short legs of each being overlapped on and secured to the long leg of the other.

3. An anti-skid chain comprising a plurality of similar links looped together at their adjacent ends, each link consisting of two members with their ends overlapped along the lengths thereof and secured together.

4. A link for an anti-skid chain consisting of two members each bent to form a loop-like portion and each having a short leg and a long leg projecting in different planes, the short leg of each being in overlapping engagement with the long leg of the other, the respective ends of the long legs providing a ground engaging surface and the respective loop portions providing a tire engaging surface.

5. An anti-skid chain adapted to be secured on a vehicle tire transversely to the tread thereof, said chain comprising a plurality of similar links looped together at their adjacent ends, each link consisting of two members each having a short leg and a long leg projecting in different planes, the short leg of each being in overlapping engagement with the long leg of the other, and the respective long legs extending, when in operative position on the tire, transversely to the tread of the tire and projecting outwardly therefrom at such an angle that the end of each long leg provides a ground engaging surface.

6. An anti-skid chain adapted to be secured on a vehicle tire transversely to the tread thereof, said chain comprising a plurality of similar links looped together at their adjacent ends, each link consisting of two substantially identical members, each having a short leg and a long leg projecting in different planes, the short leg of each being overlapped on and secured to the long leg of the other in such manner that when the chain is in operative position on the tire the looped ends will provide tire engaging surfaces, the long legs will extend in a direction transversely to and outwardly from the tread of the tire to provide ground engaging surfaces, and the ends of the short legs will be intermediate said tire engaging and ground engaging surfaces.

EDWARD WINTHROP TAYLOR.